(12) United States Patent
BenHimane et al.

(10) Patent No.: US 8,805,002 B2
(45) Date of Patent: Aug. 12, 2014

(54) METHOD OF DETERMINING REFERENCE FEATURES FOR USE IN AN OPTICAL OBJECT INITIALIZATION TRACKING PROCESS AND OBJECT INITIALIZATION TRACKING METHOD

(75) Inventors: Selim BenHimane, Munich (DE); Daniel Ulbricht, Neufahrn (DE)

(73) Assignee: Metaio GmbH, Munich (DE)

( * ) Notice: Subject to any disclaimer, the term of this patent is extended or adjusted under 35 U.S.C. 154(b) by 720 days.

(21) Appl. No.: 12/977,859

(22) Filed: Dec. 23, 2010

(65) Prior Publication Data

US 2011/0194731 A1 Aug. 11, 2011

Related U.S. Application Data

(60) Provisional application No. 61/289,763, filed on Dec. 23, 2009.

(30) Foreign Application Priority Data

Dec. 23, 2009 (EP) .................................. 09180616

(51) Int. Cl.
  *G06K 9/00* (2006.01)
  *G06K 9/46* (2006.01)
  *G06T 7/20* (2006.01)
  *G06K 9/62* (2006.01)
(52) U.S. Cl.
  CPC ..... *G06T 7/2033* (2013.01); *G06T 2207/30244* (2013.01); *G06K 9/6211* (2013.01)
  USPC ............ 382/103; 382/190; 382/219; 345/420
(58) Field of Classification Search
  None
  See application file for complete search history.

(56) References Cited

U.S. PATENT DOCUMENTS 5,850,352 A * 12/1998 Moezzi et al. ................ 345/419
6,141,041 A * 10/2000 Carlbom et al. .............. 348/169

(Continued)

FOREIGN PATENT DOCUMENTS

JP 2005-174021 6/2005

OTHER PUBLICATIONS

Fischler et al. "Random Seample Consensus: A Paradigm for Model Fitting with Applications to Image Analysis and Automated Cartography", Communications of the ACM, 24: 381-395, Jun. 1981.

(Continued)

*Primary Examiner* — Manav Seth
(74) *Attorney, Agent, or Firm* — O'Shea Getz P.C.

(57) ABSTRACT

A method of determining reference features for use in an optical object initialization tracking process is disclosed, said method comprising the following steps: a) capturing at least one current image of a real environment or synthetically generated by rendering a virtual model of a real object to be tracked with at least one camera and extracting current features from the at least one current image, b) providing reference features adapted for use in an optical object initialization tracking process, c) matching a plurality of the current features with a plurality of the reference features, d) estimating at least one parameter associated with the current image based on a number of current and reference features which were matched, and determining for each of the reference features which were matched with one of the current features whether they were correctly or incorrectly matched, e) wherein the steps a) to d) are processed iteratively multiple times, wherein in step a) of every respective iterative loop a respective new current image is captured by at least one camera and steps a) to d) are processed with respect to the respective new current image, and f) determining at least one indicator associated to reference features which were correctly matched and/or to reference features which were incorrectly matched, wherein the at least one indicator is determined depending on how often the respective reference feature has been correctly matched or incorrectly matched, respectively.

18 Claims, 5 Drawing Sheets

Matching Process

Current image with extracted features   Reference image with extracted features

(56) References Cited

U.S. PATENT DOCUMENTS

| | | | |
|---|---|---|---|
| 6,154,559 A * | 11/2000 | Beardsley | 382/103 |
| 6,563,500 B1 * | 5/2003 | Kim et al. | 345/423 |
| 6,982,710 B2 * | 1/2006 | Salomie | 345/420 |
| 7,023,536 B2 | 4/2006 | Zhang et al. | |
| 7,038,846 B2 | 5/2006 | Mandella | |
| 7,088,440 B2 | 8/2006 | Buermann et al. | |
| 7,109,993 B2 * | 9/2006 | Peleg et al. | 345/473 |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl | |
| 7,268,956 B2 | 9/2007 | Mandella | |
| 7,447,337 B2 * | 11/2008 | Zhang et al. | 382/107 |
| 7,474,809 B2 | 1/2009 | Carl et al. | |
| 7,505,617 B2 * | 3/2009 | Fu et al. | 382/128 |
| 7,536,030 B2 * | 5/2009 | Wang et al. | 382/103 |
| 7,538,764 B2 * | 5/2009 | Salomie | 345/420 |
| 7,587,064 B2 * | 9/2009 | Owechko et al. | 382/103 |
| 7,616,807 B2 * | 11/2009 | Zhang et al. | 382/154 |
| 7,620,202 B2 * | 11/2009 | Fujimura et al. | 382/103 |
| 7,706,603 B2 * | 4/2010 | Najafi et al. | 382/154 |
| 7,729,515 B2 | 6/2010 | Mandella et al. | |
| 7,805,017 B1 * | 9/2010 | Basso et al. | 382/274 |
| 7,826,641 B2 | 11/2010 | Mandella et al. | |
| 7,856,125 B2 * | 12/2010 | Medioni et al. | 382/118 |
| 7,957,583 B2 * | 6/2011 | Boca et al. | 382/154 |
| 7,961,909 B2 | 6/2011 | Mandella et al. | |
| 8,081,798 B2 * | 12/2011 | Paglieroni et al. | 382/103 |
| 8,081,820 B2 * | 12/2011 | Davis et al. | 382/173 |
| 8,126,261 B2 * | 2/2012 | Medioni et al. | 382/154 |
| 8,130,225 B2 * | 3/2012 | Sullivan et al. | 345/473 |
| 8,147,503 B2 * | 4/2012 | Zhao et al. | 606/130 |
| 8,160,302 B2 * | 4/2012 | Wagg | 382/107 |
| 8,406,532 B2 * | 3/2013 | Wang et al. | 382/209 |
| 2005/0168437 A1 | 8/2005 | Carl et al. | |
| 2011/0227915 A1 | 9/2011 | Mandella et al. | |
| 2012/0038549 A1 | 2/2012 | Mandella et al. | |
| 2013/0194418 A1 | 8/2013 | Gonzalez-Banos et al. | |

OTHER PUBLICATIONS

Graber et al. "Learning Features for Tracking", Proceedings of the IEEE Conference on Computer Vision and Pattern Recognition (CVPR), Jun. 2007.

Chum et al. "Mating with PROSAC—Progressive Sample Consensus", Proceedings of the IEEE Conference on Computer Vision and Pattern Recognition (CVPR0, Jun. 2005.

Office action for JP 2012-532629 dated Oct. 1, 2013.

Bleser, "Real time 3D camera tracking for industrial augmented reality applications", WSCG 2005 conference proceedings, ISBN 80-903100-7-9, Jan. 31-Feb. 4, 2005, Plzen, Czech Republic.

Hollander, "Random sampling methods for two-view geometry estimation", ISBN 978-90-9021839-7, 2007.

Office action for CN 201010624963.0 dated Dec. 4, 2013.

* cited by examiner

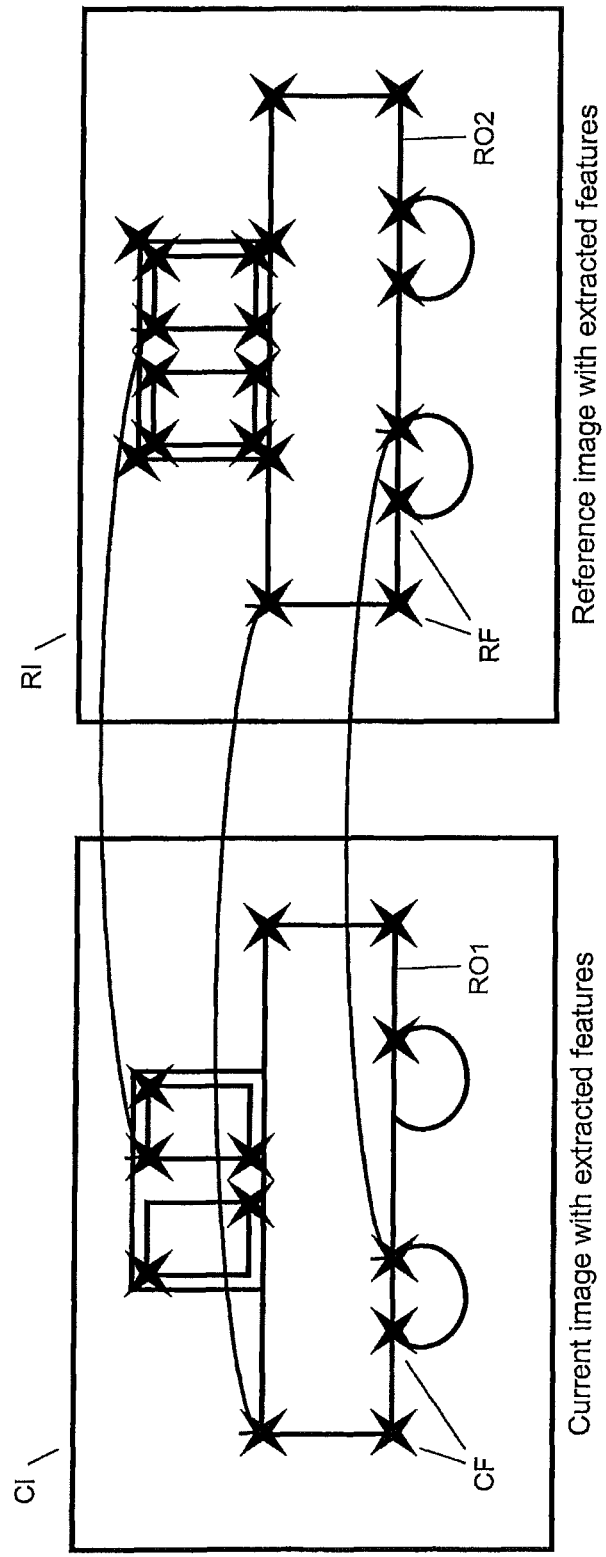

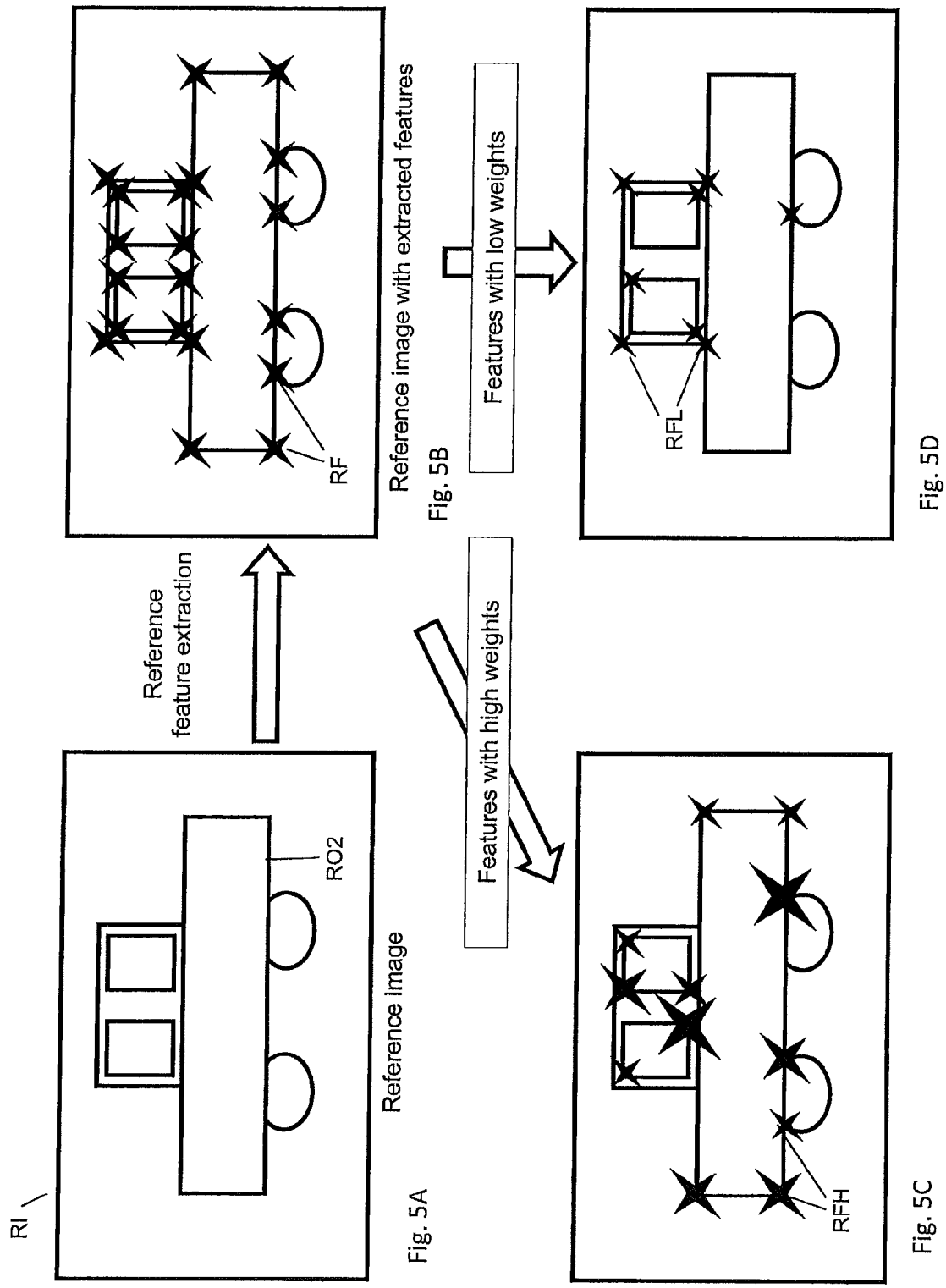

METHOD OF DETERMINING REFERENCE FEATURES FOR USE IN AN OPTICAL OBJECT INITIALIZATION TRACKING PROCESS AND OBJECT INITIALIZATION TRACKING METHOD

Applicant hereby claims priority benefits to U.S. Provisional Patent Application No. 61/289,763 filed Dec. 23, 2009, and EP Patent Appln. No. 09180616.6 filed Dec. 23, 2009, the disclosures of which are herein incorporated by reference.

BACKGROUND OF THE INVENTION

1. Technical Field

The present invention relates to a method of determining reference features for use in an optical object initialization tracking process and to an object initialization tracking method making use of reference features, for example extracted from a reference image. Moreover, the present invention relates to a computer program product comprising software code sections for implementing the method according to the invention.

2. Background Information

Augmented Reality Systems permit the superposition of computer-generated virtual information with visual impressions of a real environment. To this end, the visual impressions of the real world are mixed with virtual information, e.g. by means of a semi-transmissive data display worn on the head of a user. The blending-in of virtual information or objects can be effected in context-dependent manner, i.e. matched to and derived from the respective environment viewed. As virtual information, it is basically possible to use any type of data, such as texts, images etc. The real environment is detected e.g. with the aid of a camera carried on the head of the user.

When the person using an augmented reality system turns his or her head, tracking of the virtual objects with respect to the changing field of view is necessary. The real environment may be a complex apparatus, and the object detected can be a significant member of the apparatus. During a so-called tracking operation, a real object detected during an object initialization process may serve as a reference for computing the position at which the virtual information is to be displayed or blended-in in an image taken up by the camera. Due to the fact that the user may change his or her position and orientation, the real object has to be subjected to continuous tracking in order to display the virtual information at the correct position in the display device also in case of an altered position and/or altered orientation of the user. The effect achieved thereby is that the information, irrespective of the position and/or orientation of the user, is displayed in the display device in context-correct manner with respect to reality. An augmented reality system in this regard is an example of the utilization of such so-called markerless tracking systems.

Standard Tracking Initialization Approach:

When doing markerless tracking of a certain target given one or multiple reference images of that target, the standard tracking initialization framework can be described using the following steps. In this regard, FIG. 1 shows a flow diagram of an exemplary process in which the numbers of the following steps are denoted in parentheses.

Once a set of digital images (one or more images) are acquired:

1—Features are extracted from a set of these "reference" digital images and stored. These features are commonly referred to as "reference features" and may be denoted with where i is in $\{1, 2, \ldots, N_R\}$ and $N_R$ is the number of reference features extracted. The features can be points, a set of points (lines, segments, regions in the image or simply a group of pixels), etc.

2—Descriptors (or classifiers) may be computed for every reference feature extracted and stored. These descriptors may be called "reference" descriptors.

Then, when having the real target facing the camera that captures live or so-called "current" images:

3—For every current image captured, features are extracted. These features may be called "current features".

4—Descriptors (or classifiers) may be computed for every current feature extracted and stored. These descriptors may be referred to as "current descriptors" and may be denoted with $c_j$, where j is in $\{1, 2, \ldots, N_C\}$ and $N_C$ is the number of current features extracted.

5—The current features are matched with the reference features using the reference and current descriptors: if the descriptors are relatively close in terms of a certain similarity measure, they are matched. For example, if every descriptor is written as a vector of numbers, when comparing two descriptors, one can use the Euclidian distance between two corresponding vectors as similarity measure. A match is denoted as $m_k=\{r_k,c_k\}$ where k is in $\{1, 2, \ldots, N_M\}$ and is the $N_M$ number of matched features.

6—Given the model of the target, an outlier rejection algorithm is performed. The outlier rejection algorithm may be generally based on a robust pose estimation (explained below).

7—Using the correct matches, the "current" pose of the camera is computed.

Most of the approaches for feature-based tracking initialization perform a robust estimation in order to remove incorrect matches. This step is called outlier rejection (see above Step 6). This is due to the fact that whatever descriptor or classifier used there is no way to avoid having outliers, i.e. features that are matched incorrectly. Robust estimation allows discarding the outliers from the pose estimation.

A standard approach is disclosed in: M. A. Fischler and R. C. Bolles, "Random Sample Consensus: A Paradigm for Model Fitting with Applications to Image Analysis and Automated Cartography", Communications of the ACM 24: 381-395, June 1981. The standard approach is based on an algorithm that performs the following two steps iteratively: a) the algorithm picks randomly a sample of minimum number of features (also called Sample Set) needed to compute the parameters of a certain transformation model. This transformation can generally be described using a matrix; e.g. one can use 4 points in case the pose is computed via a homography matrix estimation, one can use 5 points in case the pose is computed via an essential matrix estimation, etc.; and b) it estimates the transformation parameters and counts the number of matches (also called Consensus Set) that verify them. To decide whether a match $m_k=\{r_k,c_k\}$ verifies the transformation parameters one can, for example, transform the reference feature $r_k$ from the reference image into the current image with this estimated transformation parameters and compute the distance between the current feature $c_k$ and the transformed reference feature. A match is considered verifying the transformation parameter set when the distance is smaller than a certain threshold $T_m$.

The algorithm performs a number $N_I$ of iterations and searches for the best transformation parameter set allowing the highest number of matches verifying that parameter set (the highest cardinality of the Consensus Set). If the number of matches corresponding to the best parameter set exceeds a certain threshold $N_m$, the matches in the Consensus Set verifying the parameter set are considered as inliers (correct matches) and the other matches are considered as outliers (incorrect matches). The condition that the number of matches corresponding to the best parameter set exceeds $N_m$ is generally used to validate the success of the tracking initialization process. Only in the case of a successful tracking initialization process one can determine whether a match is inlier or outlier.

Limitations of the Standard Approaches:

Both the standard framework (performing Steps 1 to 7 as explained above with respect to FIG. 1) and the algorithm taking place in Step 6 and performing the outlier rejection generally give good results. However, it happens that the reference images and the current images are acquired a) using different cameras (different sensors and image qualities); b) under different condition of the target (object dirty or slightly modified); c) under different lighting conditions (the object is brighter or darker in the images); and d) under very different viewpoints, etc.

This results in a very weak matching process (Step 5) since the descriptors of the features used cannot be discriminative in such conditions. In fact, the difference of the environment, of the object to be tracked or of the relative position affects the feature extraction and the feature description.

Also, it is common that the reference images are the result of an acquisition that was performed under very good or optimal conditions or even instead of using real captures of the object to be tracked as reference images, one uses as reference images screenshots of the rendering of the virtual version of the object. It is also common to use point clouds or geometries extracted from the real object (or scene) by various means (for example laser scanners coupled or not with camera or 3D cameras or Time-of-Flight cameras) as reference features. Therefore, in general, much more details can be seen in the reference images (and that cannot be seen in the live captures, i.e. in the current images) and there are usually much more reference features than current features. This often results in the following facts: The number of the reference features is very high.

This results in the matching process (Step 5) becoming inefficient and too slow for real-time or mobile applications. Only a small ratio of the reference and the current features are in common. Only a small ratio of the common features have close descriptors.

This results in that the outlier rejection algorithm (Step 6) does not work or becomes also very slow because of the high number of outliers: in hard cases, it either fails or it needs a very high number $N_I$ of iterations in order to be able to select from the random sampling one correct set of inliers. Also, it happens when the threshold $T_m$ used to consider a match as inlier is too high, the algorithm picks the wrong inliers' set.

Already Proposed Solutions:

One approach for improving the matching process is described in M. Grabner, H. Grabner, and H. Bischof, "Learning features for tracking", Proceedings of IEEE Conference on Computer Vision and Pattern Recognition (CVPR), Minneapolis, Minn., USA, June 2007., where the authors learn feature classifiers and compute weights depending on the temporal appearances and matches. They update the feature descriptors over time. Their method is based on online feature ranking based on measures using the distributions of object and background pixels. The feature ranking mechanism is embedded in a tracking system that adaptively selects the top-ranked discriminative features for tracking. The top-ranked features are the ones that best discriminate between object and background classes.

Another approach for improving the outlier rejection algorithm is as follows: In order to improve the result of the standard outlier rejection algorithm, it is possible to either rank or weigh the Consensus Set based on the matching strength or to give prior probabilities to the Sample Set (like in O. Chum and J. Matas, "Matching with PROSAC—progressive sample consensus", Proceedings of IEEE Conference on Computer Vision and Pattern Recognition (CVPR), Los Alamitos, Calif., USA, June 2005) also based on the matching strength. The matching strength generally used is based on how good the similarity measure between the descriptors of two matched features is.

It would therefore beneficial to provide a method of determining reference features for use in an optical object initialization tracking process and an object initialization tracking method making use of reference features which are capable to reduce at least some of the above mentioned limitations of standard approaches.

SUMMARY OF THE INVENTION

In a first aspect, there is provided a method of determining reference features for use in an optical object initialization tracking process, the method comprising the following steps: a) capturing at least one current image of a real environment or synthetically generated by rendering a virtual model of a real object to be tracked with at least one camera and extracting current features from the at least one current image; b) providing reference features adapted for use in an optical object initialization tracking process; c) matching a plurality of the current features with a plurality of the reference features; d) estimating at least one parameter associated with the current image based on a number of current and reference features which were matched, and determining for each of the reference features which were matched with one of the current features whether they were correctly or incorrectly matched; e) wherein the steps a) to d) are processed iteratively multiple times, wherein in step a) of every respective iterative loop a respective new current image is captured by at least one camera and steps a) to d) are processed with respect to the respective new current image; and f) determining at least one indicator associated to reference features which were correctly matched and/or to reference features which were incorrectly matched, wherein the at least one indicator is determined depending on how often the respective reference feature has been correctly matched or incorrectly matched, respectively.

In an embodiment of the invention, the indicator is a weight associated to the reference features. For example, the weight of the reference features is increased when the respective reference feature was correctly matched. According to another embodiment, additionally or alternatively, the weight of the reference features may be decreased when the respective reference feature was incorrectly matched. According to a further embodiment, if it is determined that one of the reference features is not matched, its weight is not updated.

According to an embodiment, in step d) the method includes the step of comparing at least one property of the current image with at least one property of a reference image, which provides the reference features, under consideration of the estimated at least one parameter, and verifying the estimated at least one parameter based on the comparison, and wherein the at least one indicator is updated if the estimated at least one parameter is verified.

For example, when comparing at least one property of the current image with at least one property of the reference image under consideration of the estimated at least one parameter, a verification score value may be determined which is indicative of the comparison result, and the estimated at least one parameter is verified if the verification score value is equal or beyond a verification threshold value.

According to an embodiment, the at least one parameter is, for example, indicative of a pose of the camera, a condition of the real environment and/or a property of the real object to be tracked.

The method may further comprise the step of determining at least one first indicator and second indicator associated to each of the reference features which were correctly matched and/or to each of the reference features which were incorrectly matched, the first and second indicators being indicative of different respective conditions when capturing multiple current images.

In a second aspect of the invention, there is provided an object initialization tracking method making use of reference features, the method comprising the following steps: a) capturing at least one second current image with at least one camera and extracting current features from the at least one second current image; b) providing reference features adapted for use in an optical object initialization tracking process, and providing at least one indicator associated to each of the reference features, wherein the indicator is determined according to the method as set out above with respect to the first aspect of the invention; c) the indicator is used for a selection or prioritization of reference features which are to be matched with current features of the at least one second current image, and using the selected or prioritized reference features in an object initialization tracking initialization process.

According to an embodiment, the method of the second aspect may comprise the step of updating the at least one indicator associated to reference features which were correctly matched and/or to reference features which were incorrectly matched with current features of the at least one second current image.

In a third aspect of the invention, there is provided an object initialization tracking method making use of reference features, the method comprising the following steps: a) capturing at least one first current image of a real environment or synthetically generated by rendering a virtual model of a real object to be tracked with at least one camera and extracting current features from the at least one first current image; b) providing reference features adapted for use in an optical object initialization tracking process; c) matching a plurality of the current features with a plurality of the reference features; d) determining at least one parameter associated with the first current image in an object initialization tracking process based on a number of current and reference features which were matched, and determining for each of the reference features which were matched with one of the current features whether they were correctly or incorrectly matched; e) updating at least one indicator associated to reference features which were correctly matched and/or to reference features which were incorrectly matched; f) using the indicator for a selection or prioritization of reference features which are to be matched with current features of at least one second current image captured by at least one camera, and using the selected or prioritized reference features in an object initialization tracking process with respect to the second current image.

According to an embodiment, the indicator is a weight associated to each of the reference features. For example, reference features with a weight above a first threshold value are used in the matching process and features with a weight below a second threshold value are not used in the matching process According to another embodiment of the invention, when estimating or determining the at least one parameter, a higher priority is applied to reference features that have a higher weight and a lower priority is applied to reference features that have a lower weight, wherein the priority is an input parameter when estimating or determining the parameter.

In another embodiment, the methods as described above may further comprise the steps of
providing at least one first indicator and second indicator associated to each of the reference features which were correctly matched and/or to each of the reference features which were incorrectly matched, the first and second indicator being associated to different conditions, and using at least one of the first and second indicators, or a combination of the first and second indicators, or switching between the first and second indicators for the selection or prioritization of reference features according to the current estimated condition.

For example, the at least one indicator is additionally determined according to a matching strength of the matched features.

In a further aspect of the invention, there is provided a computer program product adapted to be loaded into the internal memory of a digital computer system coupled with at least one camera, and comprising software code sections by means of which the steps according to any of the methods and embodiments as described above are performed when said product is running on said computer system.

The invention will now be explained in more detail with reference to the following Figures in which aspects of the invention are depicted according to various exemplary embodiments.

BRIEF DESCRIPTION OF THE DRAWINGS

FIG. 4 shows in a schematic manner an exemplary current image captured by a camera and depicting a real object, and an exemplary reference image depicting a reference object with respective extracted features which are to be matched, FIG. 5 shows in a schematic manner an exemplary reference image with extracted reference features which are weighted according to an embodiment of the invention.

DETAILED DESCRIPTION OF THE INVENTION

Figure 1:
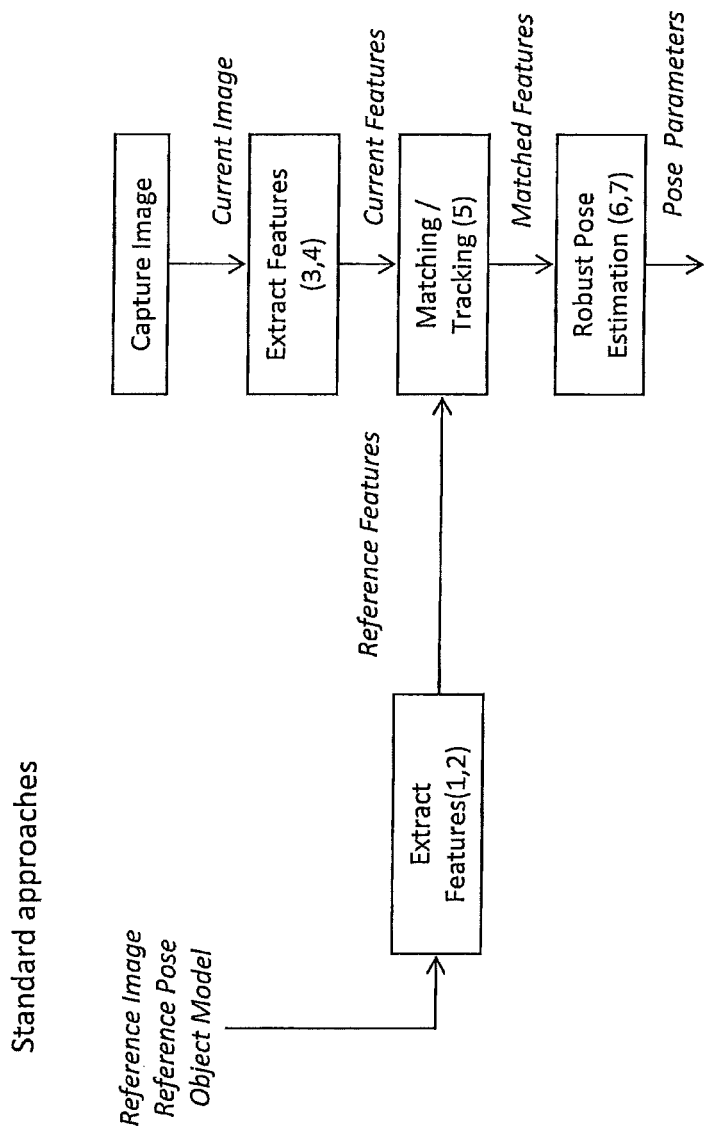
FIG. 1 shows an exemplary flow diagram of a tracking initialization process according to a standard approach.
Figure 2:
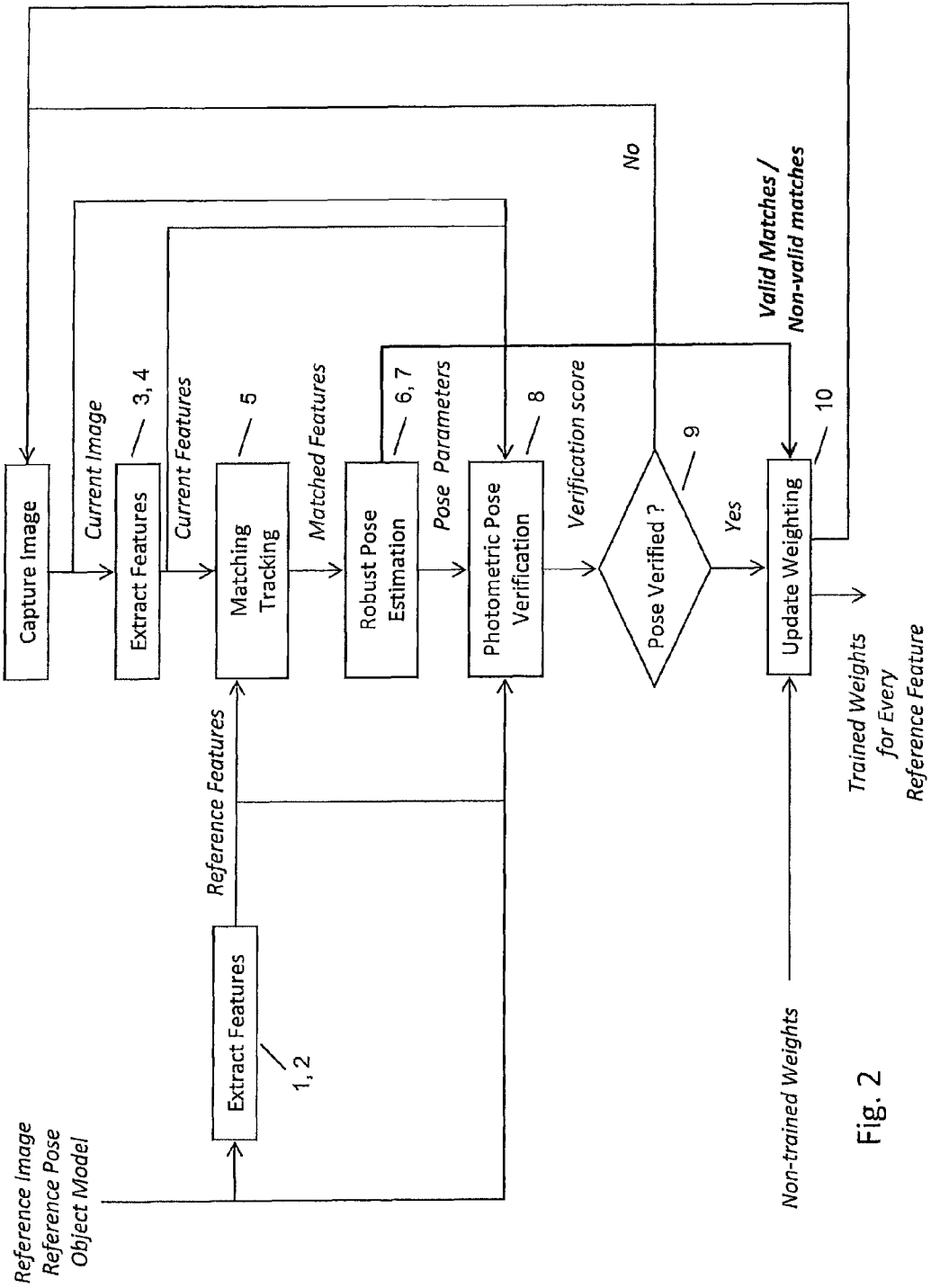
FIG. 2 shows a flow diagram of a process of determining reference features (so-called training process) for use in an optical object initialization tracking process according to an embodiment of the invention.
Figure 3:
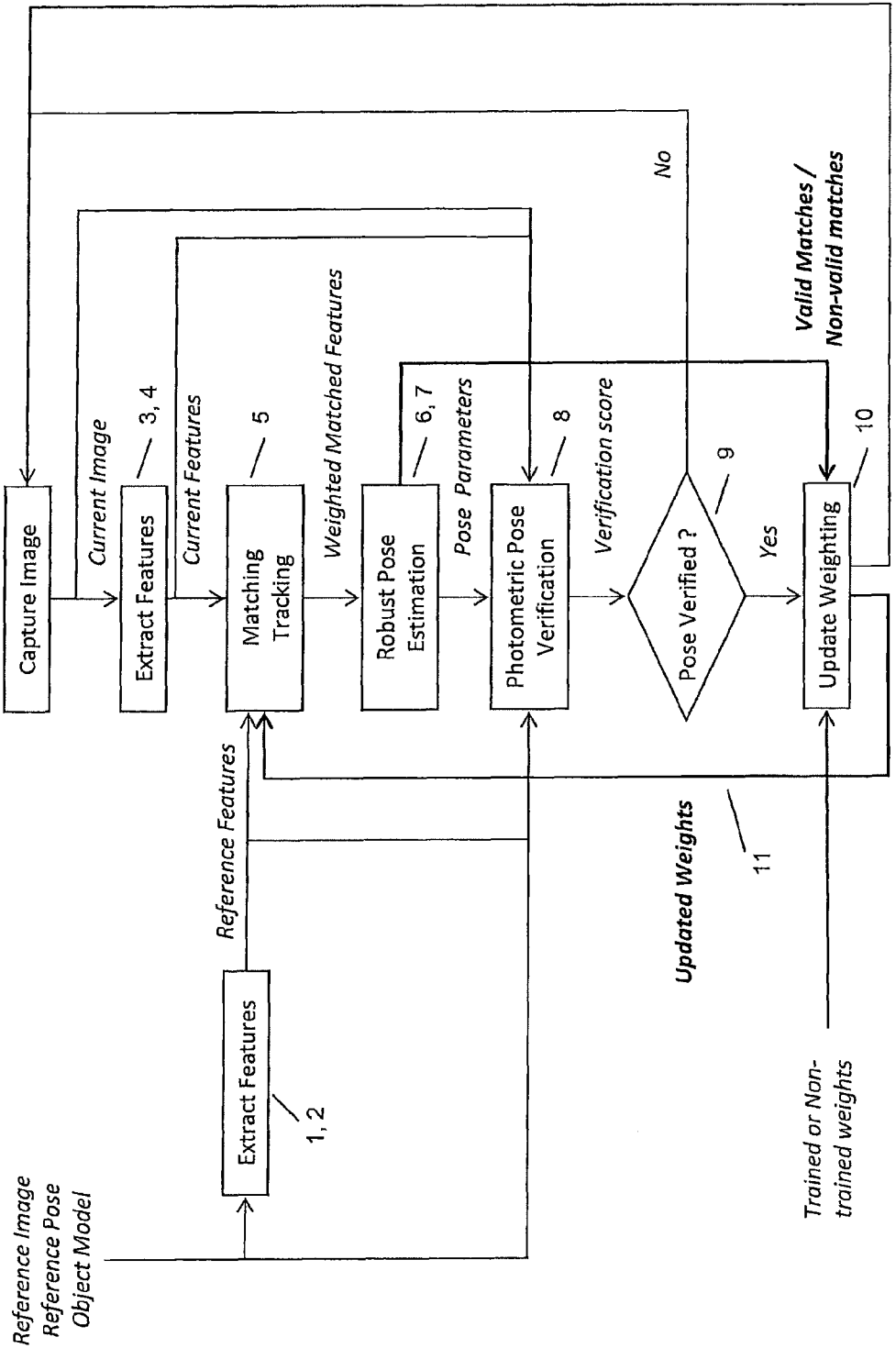
FIG. 3 shows a flow diagram of an initialization tracking process making use of reference features, indicators of which are updated in several iterative loops (so-called online updating of indicators of reference features during the initialization tracking process)

In the following, aspects and embodiments of the invention will be explained with reference to the processes as depicted in FIGS. 2 and 3 in connection with the schematic depictions of current and reference images according to FIGS. 4 and 5.

FIG. 2 shows a flow diagram of a process of determining reference features for use in an optical object initialization tracking process according to an embodiment of the invention. The process may also be called a "training process" for determining indicators of reference features in a pre-processing stage of an object tracking initialization process, as will be apparent for the skilled person from the following description. FIG. 2 depicts a possible implementation of such process. However, the skilled person will be aware that also other embodiments of such processes may be applicable.

Reference features adapted for use in an optical object initialization tracking process may be provided according to steps 1 and 2. For example, such reference features are extracted from a set of reference digital images. Schematic examples of reference features are shown in FIG. 4B, with a number of reference features RF extracted from a reference image RI which depicts a reference object RO2. The reference features RF can be points, a set of points (lines, segments, regions in the image or simply a group of pixels), etc., as will be apparent to the person skilled in the art. In addition to reference features or reference image, respectively, a reference pose and an object model may be provided. These may be used in a later photometric pose verification, as explained in more detail below.

In a further step 2, descriptors (or classifiers) may be computed for every reference feature RI extracted. These descriptors are called reference descriptors.

In a further stage of the process a real object, such as real object RO1 shown in FIG. 4A, is captured by at least one camera (not shown) in an image CI, which is referred to as current image. Therefore, current image CI shows real object RO1 as captured by the camera, wherein the object RO1 is the object to be tracked in the later object tracking initialization process. Alternatively to capturing a current image of a real environment, a current image may be generated synthetically by rendering a virtual model of a real object to be tracked.

In step 3, for every current image CI captured, features of a real object, such as real object RO1 of FIG. 4A, are extracted. These features are referred to as current features CF. In step 4, descriptors (or classifiers) may be computed for every current feature CF extracted. These descriptors are referred to as current descriptors.

In step 5, current features CF are matched with reference features RF. In the present implementation the reference and current descriptors are used for this purpose. Particularly, if the descriptors are relatively close in terms of a certain similarity measure, they are matched. For example, if every descriptor is written as a vector of numbers, when comparing two descriptors, one can use the Euclidian distance between two corresponding vectors as similarity measure.

In the following, generally, at least one parameter associated with the current image is estimated based on a number of current and reference features which were matched. According to an embodiment, such at least one parameter is indicative of a pose of the camera, a condition of the real environment and/or a property of the real object to be tracked.

In step 6, an outlier rejection algorithm is performed. The outlier rejection algorithm may be generally based on a robust pose estimation, as described above. A robust pose estimation may be performed in order to determine and remove incorrect matches. This step is also referred to as outlier rejection. This is due to the fact that whatever descriptor or classifier used there is no way to avoid having outliers, i.e. features that are matched incorrectly. Robust pose estimation allows discarding the outliers from the pose estimation. One approach that may be used is disclosed in: M. A. Fischler and R. C. Bolles, "Random Sample Consensus: A Paradigm for Model Fitting with Applications to Image Analysis and Automated Cartography", Communications of the ACM 24: 381-395, June 1981, as described above in more detail. Therefore, in step 6 it is determined for each of the reference features which were matched with one of the current features whether they were correctly or incorrectly matched. Using the correct matches, the current pose of the camera is computed (step 7).

Generally, these steps are processed iteratively multiple times, wherein in a first step of every respective iterative loop a respective new current image is captured by at least one camera and the following steps are processed with respect to the respective new current image.

As explained in the following, given reference features coming from one or multiple reference images, laser scans coupled or not coupled with camera images, or images from 3D cameras or Time-of-Flight cameras, the reference features are "trained" using a series of current images either captured "offline" (i.e. before starting an object tracking initialization process) or "online" (i.e. during an object tracking initialization process) or synthetically generated by rendering a virtual model of the object to be tracked.

In this regard, at least one indicator associated to each of the reference features which were correctly matched and/or associated to each of the reference features which were incorrectly matched is determined, wherein such indicator is determined depending on how often the respective reference feature has been correctly matched or incorrectly matched, respectively. For example, the indicator is a weight associated to the reference features.

In the particular implementation as shown in FIG. 2, steps 3, 4, 5, 6 and 7 are performed for every current image and additionally to these steps the reference features of both inlier and outlier matches provided by the outlier rejection algorithm are stored and a weight associated to every reference feature is computed, the value of the weight depending on how often that reference feature has participated in a successful tracking initialization. For example, starting from non-trained weights (i.e. all the reference features have the same weights), at every successful initialization, the weight of every reference feature may be increased when it is correctly matched and it may be decreased when it is wrongly matched. If a reference feature is not matched its weight is not updated.

As described before, only in the case of a successful tracking initialization process one can determine whether a match was correctly matched (inlier) or incorrectly matched (outlier). Therefore, the choice of the threshold $N_M$ is quite important. If this threshold is set too low, a match can be wrongly classified and the weights wrongly updated. If this threshold is set too high, the tracking initialization will be rarely considered as successful and consequently the weights will be rarely updated. In order to overcome this and in order to be able to update the weights as often as possible, according to an embodiment, the threshold $N_M$ is optionally set as low as possible and a photometric validation is performed, as shown in FIG. 2 in step 8. In the present implementation, the photometric validation consists in checking whether the pose determined with the inliers is correct or not using image information instead of using the cardinality of the inliers. For example, in case of a planar target, one can use the transformation parameter determined by the robust pose estimation in order to build a homography, warp the current image using the homography and perform a comparison between the reference image and the warped version of current image.

Generally, in step 8 at least one property of the current image may be compared with at least one property of a reference image under consideration of the estimated pose of the camera. Particularly, the estimated pose of the camera is used for determining the transformation between the current image and the reference image. For performing the comparison extracted features, pixels and/or any other properties (such as brightness, etc.) of the reference and current images may be compared. In this regard, the skilled person is aware of how such comparison may be performed in a suitable way depending on the particular situation. For example, when comparing at least one property of the current image with at least one property of the reference image under consideration of the estimated pose of the camera, a verification score value may be determined which is indicative of the comparison result, and the estimated pose of the camera is verified if the verification score value is equal or beyond a verification threshold value.

In step 9, the estimated pose of the camera is verified based on the comparison. In step 10, the weight for the respective reference features is updated according to the valid (correct) matches or non-valid (incorrect) matches, as determined in the robust pose estimation described above, if the estimated pose of the camera is verified. The process may then return to the step of capturing a new current image and processing the following steps 3 to 10 with respect to the respective new current image. If the process for training the reference features is completed or terminated, the trained weights for every reference feature may be output and used for a subsequent tracking initialization process.

FIG. 5 shows in a schematic manner an exemplary reference image RI depicting a reference object RO with extracted reference features RF which are weighted in a final stage of a training process according to an embodiment of the invention. FIGS. 5C and 5D show reference features RFH with high weights and reference features RFL with low weights, respectively, determined in several iterative loops of a training process, which may be output and used for a subsequent tracking initialization process. The depicted magnitude of the reference features RFH, RFL is indicative of their respective weight.

Generally, having the trained weights of a previous training process, in a subsequent tracking initialization process at least one second or further current images are captured with at least one camera and current features from the respective further current images are extracted. Reference features are provided along with at least one respective indicator (e.g. weight) associated to each of the reference features, wherein the respective indicators were determined ("trained") according to the described training process. The indicators may then be used for a selection or prioritization of reference features which are to be matched with current features of the further current images captured during the tracking initialization process. The selected or prioritized reference features may then be used in the tracking initialization process.

According to an embodiment, the weights are then used for the selection or prioritization of the features to be matched and to be used during the tracking initialization process (a) and for the robust pose estimation (b) as follows: (a) The reference features with very low weight are not used in the matching process. This not only reduces the number of the reference features which results in a clear speed up of the matching process, but it also improves the results of the matching process since only the best reference features that showed to allow successful initializations are kept; (b) The robust pose estimation will give priorities in its picking of the Sampling Set (cf. the approach for robust pose estimation as described above) to the features that have high weights and it will give low priority to the features with low weights in order to guide the "random" sampling procedure. It will also use the weights to evaluate the quality of the Consensus Set.

FIG. 3 shows a flow diagram of an initialization tracking process, wherein the weights of the reference features are updated in several iterative loops in a so-called "online" updating during a initialization tracking process. The performed steps 1 to 10 as shown in FIG. 3 are the same as described with reference to FIG. 2. As a difference to the process of FIG. 2 where the process for training the reference features is completed or terminated and the trained weights for every reference feature are then output and used for a subsequent tracking initialization process, according to FIG. 3 the training process is performed during a tracking initialization process. Accordingly, in a step 11 after updating a respective indicator (weight) of reference features in a respective loop, the updated weight is provided as an input to the matching process in step 5 performed in the subsequent iterative loop. In this way, the tracking initialization process may improve after each iterative loop since the weight of reference features which were correctly matched (valid matches) is gradually increased and the weight of reference features which were incorrectly matched (non-valid matches) is gradually decreased.

Generally, in such online updating process, in each iterative loop the at least one indicator (e.g. weight) is updated, and the indicator is then used for a selection or prioritization of the reference features which are to be matched with current features of at least one further current image captured by at least one camera in a subsequent iterative loop of the tracking initialization process. The selected or prioritized reference features are then used in the object initialization tracking process with respect to the further current image, e.g. for determining the pose of the camera which captured the further current image.

According to an embodiment, the online process as described above with respect to FIG. 3 may be combined with an offline process as described with respect to FIG. 2. Particularly, trained weights according to the process of FIG. 2 may be supplied as initial input parameters to the process according to FIG. 3, so that the process starts with trained weights which may further be improved in the tracking initialization process.

Further Optional Improvements or Embodiments:

As said before, the weights may be determined according to the number of times that a feature was correctly matched in previous images. When a feature is extracted and correctly matched the weight increases, and when a feature is extracted and incorrectly matched the weight decreases. Optionally, the weights can additionally be determined according to the matching strength.

The feature training can be done either in a pre-processing stage (see a possible implementation in FIG. 2), i.e. with a set of current images acquired beforehand and used for that purpose. It can also be done without pre-processing stage and be performed online (see a possible implementation in FIG. 3). Or it can be done in a pre-processing stage and the weights continue to be updated online (see a possible implementation in FIG. 3).

The training can also be performed under several different conditions such as training with respect to bright lightening conditions, dark lighting conditions, using a camera at a far distance from the object to be tracked or close distance, different status of the object to be tracked. Then, these different training results may be combined, or switching between them may be performed according to the results obtained during the online tracking initialization process.

In another embodiment, the online or offline processes as described above may further comprise the steps of providing at least one first indicator and second indicator associated to each of the reference features which were correctly matched and/or to each of the reference features which were incorrectly matched, the first and second indicator being associated to different conditions (such as conditions of a real environment, e.g. brightness or light conditions etc.). The first and second indicators, or a combination of the first and second indicators, may then be used for the selection or prioritization of reference features according to the current estimated condition. Alternatively, switching between the first and second indicators may be performed for the selection or prioritization of reference features according to the current estimated condition.

While this detailed description has set forth some embodiments of the present invention, the appended claims cover also other embodiments of the present invention which may differ from the described embodiments according to various modifications and some aspects. Further, it is to be understood that the above description of a possible implementation is intended to be illustrative and not restrictive. Moreover, in this disclosure the terms "first", "second", etc., are used merely as labels, and are not intended to impose numerical requirements on their objects. Other embodiments and modifications within the scope of the claims will be apparent to those of skill in the art upon studying the above description in connection with the drawings.

What is claimed is:

1. A method of determining reference features for use in an optical object initialization tracking process, said method comprising the following steps:
 a) capturing at least one current image synthetically generated by rendering a virtual model of a real object to be tracked with at least one camera and extracting current features from the at least one current image;
 b) providing reference features adapted for use in an optical object initialization tracking process;
 c) matching a plurality of the current features with a plurality of the reference features;
 d) estimating at least one parameter associated with the current image based on a number of current and reference features which were matched, and determining for each of the reference features which were matched with one of the current features whether they were correctly or incorrectly matched;
 e) wherein the steps a) to d) are processed iteratively multiple times, wherein in step a) of every respective iterative loop a respective new current image is captured by at least one camera and steps a) to d) are processed with respect to the respective new current image; and
 f) determining at least one indicator associated to reference features which were correctly matched and/or to reference features which were incorrectly matched, wherein the at least one indicator is determined depending on how often the respective reference feature has been correctly matched or incorrectly matched, respectively.

2. The method of claim 1, wherein the indicator is a weight associated to the reference features.

3. The method of claim 2, wherein the weight of the reference features is increased when the respective reference feature was correctly matched.

4. The method of claim 2, wherein the weight of the reference features is decreased when the respective reference feature was incorrectly matched.

5. The method of claim 2, wherein if one of the reference features is not matched, its weight is not updated.

6. The method of claim 1, wherein in step d) the method includes the step of comparing at least one property of the current image with at least one property of a reference image, which provides the reference features, under consideration of the estimated at least one parameter, and verifying the estimated at least one parameter based on the comparison, and wherein the at least one indicator is updated if the estimated at least one parameter is verified.

7. The method of claim 6, wherein when comparing at least one property of the current image with at least one property of the reference image under consideration of the estimated at least one parameter, a verification score value is determined which is indicative of the comparison result, and the estimated at least one parameter is verified if the verification score value is equal or beyond a verification threshold value.

8. The method of claim 7, further comprising the step of determining at least one first indicator and second indicator associated to each of the reference features which were correctly matched and/or to each of the reference features which were incorrectly matched, the first and second indicators being indicative of different respective conditions when capturing multiple current images.

9. An object initialization tracking method making use of reference features, said method comprising the following steps:
 capturing at least one second current image with at least one camera and extracting current features from the at least one second current image;
 providing reference features adapted for use in an optical object initialization tracking process, and providing at least one indicator associated to each of the reference features, wherein the indicator is determined by:
  a) capturing at least one current image synthetically generated by rendering a virtual model of a real object to be tracked with at least one camera and extracting current features from the at least one current image;
  b) providing reference features adapted for use in an optical object initialization tracking process; c) matching a plurality of the current features with a plurality of the reference features;
  d) estimating at least one parameter associated with the current image based on a number of current and reference features which were matched, and determining for each of the reference features which were matched with one of the current features whether they were correctly or incorrectly matched;
  e) wherein the steps a) to d) are processed iteratively multiple times, wherein in step a) of every respective iterative loop a respective new current image is captured by at least one camera and steps a) to d) are processed with respect to the respective new current image; and
  f) determining at least one indicator associated to reference features which were correctly matched and/or to reference features which were incorrectly matched, wherein the at least one indicator is determined depending on how often the respective reference feature has been correctly matched or incorrectly matched, respectively; and
 using the indicator for a selection or prioritization of reference features which are to be matched with current features of the at least one second current image, and using the selected or prioritized reference features in an object initialization tracking initialization process.

10. The method of claim 9, further comprising the step of updating the at least one indicator associated to reference features which were correctly matched and/or to reference features which were incorrectly matched with current features of the at least one second current image.

11. An object initialization tracking method making use of reference features, said method comprising the steps of:
 a) capturing at least one first current image synthetically generated by rendering a virtual model of a real object to be tracked with at least one camera and extracting current features from the at least one first current image;

b) providing reference features adapted for use in an optical object initialization tracking process;
c) matching a plurality of the current features with a plurality of the reference features;
d) determining at least one parameter associated with the first current image in an object initialization tracking process based on a number of current and reference features which were matched, and determining for each of the reference features which were matched with one of the current features whether they were correctly or incorrectly matched;
e) updating at least one indicator associated to reference features which were correctly matched and/or to reference features which were incorrectly matched; and
f) using the indicator for a selection or prioritization of reference features which are to be matched with current features of at least one second current image captured by at least one camera, and using the selected or prioritized reference features in an object initialization tracking process with respect to the second current image.

12. The method of claim 11, wherein the indicator is a weight associated to each of the reference features.

13. The method of claim 11, wherein the indicator is a weight associated to each of the reference features, and reference features with a weight above a first threshold value are used in the matching process and features with a weight below a second threshold value are not used in the matching process.

14. The method of claim 11, wherein when estimating or determining the parameter, a higher priority is applied to reference features that have a higher weight and a lower priority is applied to reference features that have a lower weight, wherein the priority is an input parameter when estimating or determining the parameter.

15. The method of claim 11, further comprising
providing at least one first indicator and second indicator associated to each of the reference features which were correctly matched and/or to the reference features which were incorrectly matched, the first and second indicator being associated to different conditions, and
using at least one of the first and second indicators, or a combination of the first and second indicators, or switching between the first and second indicators for the selection or prioritization of reference features according to the current estimated condition.

16. The method of claim 15, wherein the at least one indicator is additionally determined according to a matching strength of the matched features.

17. The method of claim 11, wherein the at least one parameter is indicative of at least one of the following: a pose of the camera, a condition of the real environment, a property of the real object to be tracked.

18. A non-transitory computer-readable medium comprising software code sections adapted to be loaded into the internal memory of a digital computer system coupled with at least one camera, and being used to determine reference features for use in an optical object initialization tracking process, and by means of which the following steps are performed:
a) capturing at least one current image synthetically generated by rendering a virtual model of a real object to be tracked with at least one camera and extracting current features from the at least one current image;
b) providing reference features adapted for use in an optical object initialization tracking process;
c) matching a plurality of the current features with a plurality of the reference features;
d) estimating at least one parameter associated with the current image based on a number of current and reference features which were matched, and determining for each of the reference features which were matched with one of the current features whether they were correctly or incorrectly matched;
e) wherein the steps a) to d) are processed iteratively multiple times, wherein in step a) of every respective iterative loop a respective new current image is captured by at least one camera and steps a) to d) are processed with respect to the respective new current image; and
f) determining at least one indicator associated to reference features which were correctly matched and/or to reference features which were incorrectly matched, wherein the at least one indicator is determined depending on how often the respective reference feature has been correctly matched or incorrectly matched, respectively.

* * * * *